(12) United States Patent
Oliver et al.

(10) Patent No.: US 9,712,034 B2
(45) Date of Patent: Jul. 18, 2017

(54) ELECTROMECHANICAL ACTUATOR TO REDUCE HEATING EFFECTS

(71) Applicant: Nanomechanics, Inc., Oak Ridge, TN (US)

(72) Inventors: Warren Oliver, Knoxville, TN (US); John Swindeman, Knoxville, TN (US); Michael Drake, Knoxville, TN (US)

(73) Assignee: Nanomechanics, Inc., Oak Ridge, TN (US)

( * ) Notice: Subject to any disclaimer, the term of this patent is extended or adjusted under 35 U.S.C. 154(b) by 277 days.

(21) Appl. No.: 14/384,801

(22) PCT Filed: Mar. 15, 2013

(86) PCT No.: PCT/US2013/031850
§ 371 (c)(1),
(2) Date: Sep. 12, 2014

(87) PCT Pub. No.: WO2013/138682
PCT Pub. Date: Sep. 19, 2013

(65) Prior Publication Data
US 2015/0028696 A1    Jan. 29, 2015

Related U.S. Application Data

(60) Provisional application No. 61/611,187, filed on Mar. 15, 2012.

(51) Int. Cl.
*H02K 41/03* (2006.01)
*H02K 41/035* (2006.01)
*H02K 9/02* (2006.01)
*H01F 7/06* (2006.01)

(52) U.S. Cl.
CPC ......... *H02K 41/0356* (2013.01); *H01F 7/066* (2013.01); *H02K 9/02* (2013.01)

(58) Field of Classification Search
CPC ........................... H02K 41/0356; H02K 9/02
USPC ............................ 310/12.06, 52, 54, 58, 64
See application file for complete search history.

(56) References Cited

U.S. PATENT DOCUMENTS 3,668,487 A * 6/1972 Cuzner ............... G11B 5/5521
  310/27
3,671,829 A * 6/1972 Mathews ............... H02K 33/18
  310/27
3,753,384 A * 8/1973 Anfindsen ............... B23B 29/12
  310/14

(Continued)

*Primary Examiner* — Hanh Nguyen
(74) *Attorney, Agent, or Firm* — Luedeka Neely Group PC

(57) ABSTRACT

The application describes an electromechanical actuator for generating a mechanical force to be transferred to an apparatus. The electromechanical actuator comprises an electromagnetic coil, a connecting member, and a magnet. The connecting member is mechanically coupled between the electromagnetic coil and the apparatus and is configured to transfer the mechanical force from the electromagnetic coil to the apparatus. The magnet is disposed between the electromagnetic coil and the apparatus and includes a channel in which the electromagnetic coil is disposed, the channel having a channel opening that faces away from the apparatus, the magnet further having a central hole through which the connecting member extends.

15 Claims, 1 Drawing Sheet

(56) References Cited

U.S. PATENT DOCUMENTS

| | | | |
|---|---|---|---|
| 3,864,695 A * | 2/1975 | Nagashima | B43L 13/024 |
| | | | 318/128 |
| 3,965,377 A * | 6/1976 | Carbonneau | F02M 23/10 |
| | | | 310/14 |
| 5,499,143 A | 3/1996 | Sakamoto et al. | |
| 7,800,267 B2 * | 9/2010 | Sahara | F16C 25/08 |
| | | | 310/401 |
| 7,831,059 B1 | 11/2010 | Sahyoun | |
| 2003/0140907 A1 | 7/2003 | Gagnon et al. | |
| 2008/0204175 A1 | 8/2008 | Barabas-Lammert | |
| 2012/0019085 A1 * | 1/2012 | Koga | H02K 3/12 |
| | | | 310/71 |

* cited by examiner

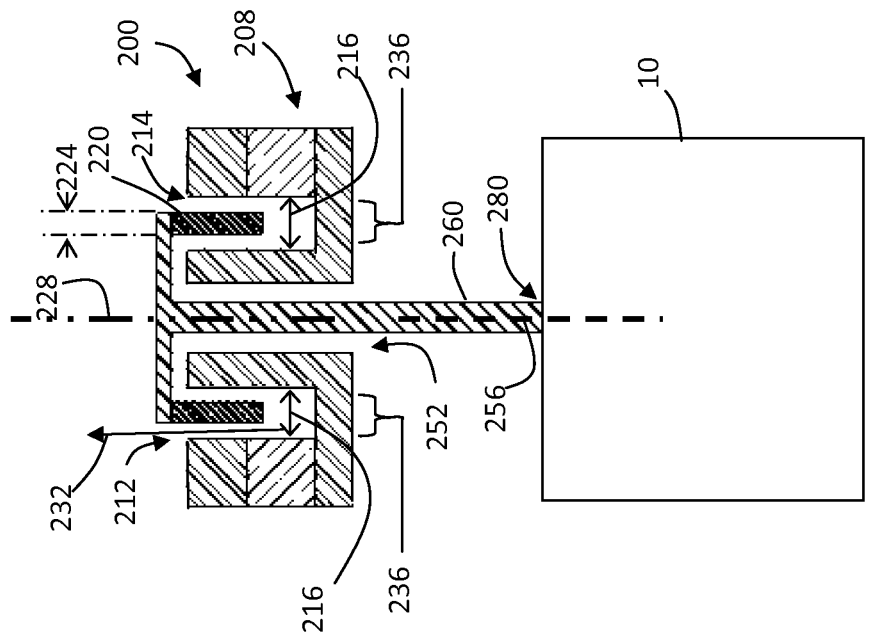
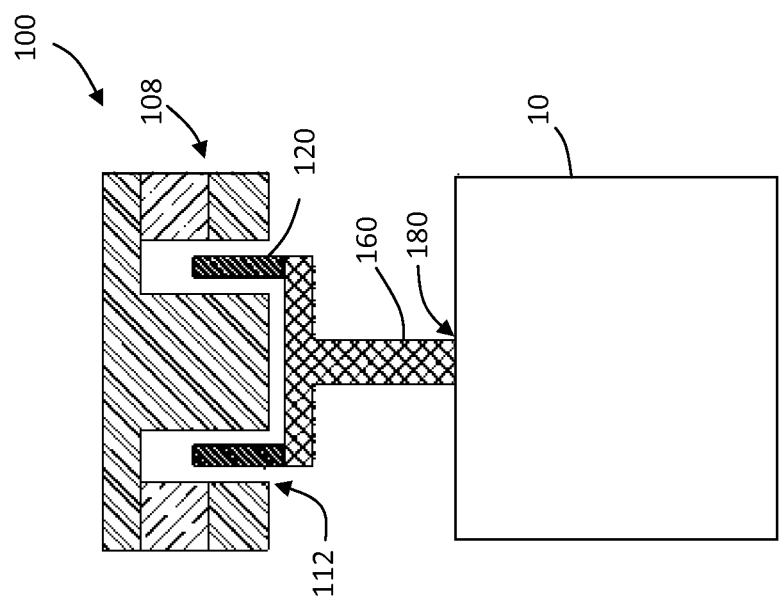

# ELECTROMECHANICAL ACTUATOR TO REDUCE HEATING EFFECTS

FIELD

This invention relates to the field of electromechanical actuators. More particularly, this invention relates to an electromechanical actuator for reducing the heating effects of the electromechanical actuator.

BACKGROUND

Electromechanical actuators create motion in a straight line and are used in a wide range of applications where linear motion is required. Examples of applications for electromechanical actuators include industrial and material testing applications.

In addition to linear motion, when electromechanical actuators are activated heat is created. When the electromechanical actuator is used in connection with applications that are highly sensitive to thermal variation, the heat created by the electromechanical actuator may cause significant interference or errors in any measurements obtained in connection with the electromechanical actuator.

What is needed, therefore, is an electromechanical actuator that reduces any heating effects of the electromechanical actuator.

SUMMARY OF THE INVENTION

The aforementioned and other needs are fulfilled by one or more aspects of the invention disclosed herein. The present disclosure relates to an electromechanical actuator for reducing the heating effects of the electromechanical actuator.

In a first aspect, the present disclosure provides an electromechanical actuator for generating a mechanical force to be transferred to an apparatus. The electromechanical actuator comprises an electromagnetic coil, a connecting member, and a magnet. The connecting member is mechanically coupled between the electromagnetic coil and the apparatus and is configured to transfer the mechanical force from the electromagnetic coil to the apparatus. The magnet is disposed between the electromagnetic coil and the apparatus and includes a channel in which the electromagnetic coil is disposed, the channel having a channel opening that faces away from the apparatus, the magnet further having a central hole through which the connecting member extends.

In some embodiments, the magnet is a permanent magnet. In certain embodiments, the magnet is an electromagnet.

In some embodiments, the central hole has a first axis and the channel has a second axis that is parallel to the first axis.

In certain embodiments, the apparatus is a nanoindentation apparatus.

In some embodiments, the magnet further comprises one or more vent apertures formed therethrough for convecting heat away from the away from the apparatus.

In one embodiment, the electromechanical actuator further comprises one or more cooling elements adjacent the magnet.

In another embodiment, the channel is circular and concentric with the central hole.

In a second aspect, the present disclosure provides an electromechanical actuator comprising a magnet having an upward facing channel opening when the electromechanical actuator is in a vertical orientation and a central hole formed therethrough, an electromagnetic coil disposed in the channel, and a connecting member having a first end secured to the electromagnetic coil and an opposing second end secured to an apparatus, the connecting member extending through the central hold formed in the magnet. The connecting member applies a mechanical force to the apparatus when the electromagnetic coil is electrically energized.

In one embodiment, at least a portion of the channel is open to an ambient room atmosphere through an entirely vertical pathway when the electromechanical actuator is in a vertical orientation.

In a third aspect, the present disclosure provides an electromechanical actuator comprising a magnet having an outward facing channel opening and a hole formed through the magnet, an electromagnetic coil disposed in the channel, and a connecting member having a first end and an opposing second end, the connecting member secured to the electromagnetic coil at the first end, extending through the hole formed in the magnet and secured to a nanoindentation apparatus at the second end of the connecting member. When the electromagnetic coil is electrically energized the connecting member applies a mechanical force to the apparatus. The hole formed through the magnet has a first axis and the channel has a second axis, the second axis being parallel to the first axis. When the electromechanical actuator is in a vertical orientation at least a portion of the channel is open to an ambient room atmosphere through an entirely vertical pathway.

A more complete appreciation of the present disclosure and its scope can be obtained from the following description of the invention.

BRIEF DESCRIPTION OF THE DRAWINGS

FIG. 1 is a cross-sectional view of an electromechanical actuator; and

FIG. 2 is a cross-sectional view of an exemplary embodiment of an electromechanical actuator to reduce heating effects.

DETAILED DESCRIPTION

The following detailed description provides exemplary embodiments of an electromechanical actuator to reduce heating effects. The description is not to be taken in a limiting sense, but is made merely for the purpose of illustrating exemplary and preferred embodiments.

Typical embodiments of the present disclosure provide an electromechanical actuator with an electromagnetic coil that is disposed in a portion of a magnet, which provides thermal insulation between the electromagnetic coil and an apparatus.

Electromechanical force actuators generate heat as well as the intended mechanical force. The generated heat may adversely affect the performance of a system to which the actuator is connected.

FIG. 1 is a cross-sectional view of an electromechanical actuator 100 connected to an apparatus 10. The apparatus 10 may, for example, be a measurement tip or probe, or a material processing tip, or a material sample, or an actuator for a providing a mechanical tensile or compressive force, or any other device for which the application of a mechanical force is desired and that may be sensitive to heat. The electromechanical actuator 100 includes a magnet 108. The magnet 108 may be a permanent magnet or an electromagnet. As referred to herein, a permanent magnet may be formed of a material that is magnetized and creates its own persistent magnetic field, while an electromagnet may produce a magnetic field by the flow of electric current and the magnetic field ceases when the current is turned off.

The magnet 108 has a channel 112 having a downward facing opening (in the orientation that is illustrated) in which an electromagnetic coil 120 is disposed. Thus, the magnet 108 is positioned around the electromagnetic coil 120. The electromechanical actuator 100 is mechanically coupled to the apparatus 10 with a connecting member 160 through which a mechanical force is transferred to the apparatus 10 at a place of engagement 180 when the electromagnetic coil 120 is electrically energized. Heat generated by the electrically energized electromagnetic coil 120 transfers to the apparatus 10 and may affect the performance of the apparatus 10.

FIG. 2 is a cross-sectional view of an exemplary embodiment of an electromechanical actuator 200 according to the present disclosure, connected to the apparatus 10. The electromechanical actuator 200 is depicted in a vertical orientation in FIG. 2 in order to provide a frame of reference (i.e. what is "vertical") for describing the comparative spatial orientations the various components. However in actual applications, the electromechanical actuator 200 may be tilted or rotated to any other (non-vertical) orientation. The electromechanical actuator 200 may include a magnet 208. The magnet 208 may be a permanent magnet or an electromagnet. The magnet 208 has a channel 212 having an upward-facing (in the orientation illustrated) channel opening 214. As further illustrated in FIG. 2, the channel opening 214 faces away from the apparatus 10. The channel 212 is preferably circular and formed around an axis 228. An electromagnetic coil 220 is disposed in the channel 212.

The channel 212 has as width 216 and the electromagnetic coil 220 has a thickness 224. Often, to improve performance of the electromechanical actuator 200, it is desirable to minimize the difference (i.e., to minimize the gap) between the width 216 of the channel and the thickness 224 of the electromagnetic coil 220. Because of this minimal clearance, proper alignment of the electromagnetic coil 220 in the channel 212 may be difficult to obtain. The orientation (in FIG. 2) of the channel 212 (with its outward-facing channel opening 214) facilitates visual observation of the electromagnetic coil 220 when making that alignment, both during original manufacturing and subsequently if maintenance is required.

The electromechanical actuator 200 may be mechanically coupled to the apparatus 10 with a connecting member 260 that may extend through a central opening 252 in the magnet 208. When the electromagnetic coil 220 is electrically energized a mechanical force is transferred to the apparatus 10 by the connecting member 260 at a place of engagement 280. In the embodiment of FIG. 2 the channel opening 214 is facing away from the place of engagement 280. Further, the hole 252 has an axis 256. Typically, the axis 228 of the channel 212 is parallel with the axis 256 of the hole 252. In the embodiment of FIG. 2 the axis 228 of the channel 212 and the axis 256 of the hole 252 are co-axial, which also means, of course, that they are parallel.

As seen in FIG. 2, the magnet 208 may be positioned under and around the electromagnetic coil 220. Thus the magnet 208, in its position between the electromagnetic coil 220 and the apparatus 10, may help thermally isolate the apparatus 10 from the electromagnetic coil 220, thereby reducing the transfer of heat generated by the electromagnetic coil 220 to the apparatus 10 regardless of the orientation of the apparatus 10 and electromechanical actuator 200. Further, when the apparatus 10 and electromechanical actuator 200 are oriented vertically (as illustrated in FIG. 2), the heat may rise convectively away from the apparatus 10 to an ambient room atmosphere through an entirely vertical pathway 232, without, for example, being trapped by the magnet 108 of FIG. 1.

Vent apertures (through-holes) may be provided in regions 236 of the magnet 208, or elsewhere in the magnet 208 (particularly in applications where the electromechanical actuator 200 is not oriented vertically). Such apertures facilitate convection of heat away from the apparatus 10. Active cooling elements (e.g., cooling coils with heat transfer liquids or gases) or passive cooling elements (e.g., heat transfer fins) may also be added adjacent the regions 236 of the magnet 208, or elsewhere adjacent other regions of the magnet 208. Passive cooling elements may also be added on the top of the connecting member 260 adjacent the electromagnetic coil 220.

The electromechanical actuator 200 may be fabricated in an integrated process or assembled from separately fabricated components. In one application, the use of the electromechanical actuator 200 is in a nanoindentation apparatus, which may reduce heating effects to maintain a stable temperature for a high sensitivity displacement sensor. As referred to herein, a nanoindentation apparatus is an apparatus for performing a variety of indentation hardness tests applied to small volumes to test the mechanical properties of a variety of materials.

The electromechanical actuator of the present disclosure reduces heating effects caused by activation of the actuator by allowing any heat generated by the electromagnetic coil, magnet, or other components of the actuator to ventilate away from the apparatus 10 and connecting member 260. This is particularly beneficial during nanoindentation testing where isolation of environmental factors is desired during testing. Because forces measured in milli-Newtons and displacements measured in nanometers occur during nanoindentation testing, any outside factors such as variations in temperature may cause significant errors in the nanoindentation test. By reducing any heating effects, any errors during the testing process that are the result of thermal variation are thereby reduced.

The previously described embodiments of the present disclosure have many advantages. The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention.

What is claimed is:

1. An electromechanical actuator for generating a mechanical force to be transferred to a material being measured or processed, wherein variations in temperature to which the material is exposed during measurement or processing may cause errors in the measurement or processing, the electromechanical actuator comprising:

an electromagnetic coil that generates heat as it is energized;

a connecting member mechanically coupled between the electromagnetic coil and the material, the connecting member being configured to transfer the mechanical force from the electromagnetic coil to the material; and a magnet disposed between the electromagnetic coil and the material and disposed between the electromagnetic coil and the connecting member to thermally isolate the material and the connecting member from the heat generated by the electromagnetic coil, the magnet having a channel in which the electromagnetic coil is disposed, the channel having a channel opening that faces away from the material, the channel opening allowing heat generated by the electromagnetic coil to be directed away from the material, the magnet further having a central hole through which the connecting member extends.

2. The electromechanical actuator of claim 1 wherein the magnet is a permanent magnet.

3. The electromechanical actuator of claim 1 wherein the magnet is an electromagnet.

4. The electromechanical actuator of claim 1 wherein the central hole has a first axis and the channel has a second axis that is parallel to the first axis.

5. The electromechanical actuator of claim 1 wherein the magnet further includes one or more vent apertures through which heat moves away from the material.

6. The electromechanical actuator of claim 1 further comprising one or more cooling elements adjacent the magnet.

7. The electromechanical actuator of claim 1 wherein the channel is circular and concentric with the central hole.

8. The electromechanical actuator of claim 1 wherein the connecting member engages the material through one or more of a measurement tip, a measurement probe, and a material processing tip.

9. The electromechanical actuator of claim 1 wherein the connecting member is configured to transfer a mechanical tensile force.

10. The electromechanical actuator of claim 1 wherein the connecting member is configured to transfer a mechanical compressive force.

11. The electromechanical actuator of claim 1 wherein the connecting member is configured to engage the material to perform a nanoindentation hardness test.

12. A material testing apparatus comprising:
a measurement tip for providing a mechanical tensile force or a compressive force to a material under test, wherein variations in temperature to which the measurement tip is exposed may cause errors in test results;
an electromechanical actuator coupled to the measurement tip, the electromechanical actuator for generating a mechanical force to be transferred to the measurement tip to cause displacement of the measurement tip relative to the material under test, the electromechanical actuator comprising:
a circular magnet having a central opening that passes through the magnet, and a concentric channel disposed around the central opening and having a channel opening facing away from the measurement tip, wherein regions of the circular magnet disposed between the concentric channel and the measurement tip thermally isolate the concentric channel from the measurement tip;
a circular electromagnetic coil disposed at least partially in the concentric channel of the circular magnet, the circular electromagnetic coil generating heat and electromotive force when energized; and
a connecting member having a first end secured to the electromagnetic coil, and a second end extending through the central opening in the magnet and secured to the measurement tip,
wherein the electromotive force generated by the electromagnetic coil is transferred through the connecting member to the measurement tip to cause displacement of the measurement tip relative to the material under test, and
wherein the heat generated by the electromagnetic coil is transferred from the concentric channel through the channel opening and away from the measurement tip and the material under test.

13. The material testing apparatus of claim 12 wherein the circular magnet includes vent apertures through the regions of the circular magnet disposed between the concentric channel and the measurement tip, the vent apertures providing a path to transfer heat away from the measurement tip.

14. The material testing apparatus of claim 12 wherein the electromechanical actuator generates the mechanical force measured in millinewtons (mN) to cause displacement of the measurement tip measured in nanometers (nm).

15. An electromechanical actuator for generating a mechanical force to be transferred to a material being measured or processed, the electromechanical actuator comprising:
an electromagnetic coil;
a connecting member mechanically coupled between the electromagnetic coil and the material, the connecting member being configured to transfer the mechanical force from the electromagnetic coil to the material; and
a circular magnet disposed between the electromagnetic coil and the material, the magnet having:
a central opening through which the connecting member extends to engage the material; and
a concentric channel in which the electromagnetic coil is disposed, the concentric channel disposed around the central opening, the concentric channel having a channel opening that faces away from the material, wherein the channel opening facilitates visual observation of the alignment of the electromagnetic coil with respect to the concentric channel of the magnet.

* * * * *